United States Patent [19]

Amick

[11] 4,273,878

[45] Jun. 16, 1981

[54] POLYAMINE-CROSSLINKED ANION EXCHANGE RESIN

[75] Inventor: David R. Amick, Chalfont, Pa.

[73] Assignee: Rohm and Haas Company, Philadelphia, Pa.

[21] Appl. No.: 45,366

[22] Filed: Jun. 4, 1979

Related U.S. Application Data

[62] Division of Ser. No. 927,196, Jul. 24, 1978, Pat. No. 4,191,814.

[51] Int. Cl.³ ............................ C08F 8/32; B01J 41/08
[52] U.S. Cl. .......................................... 521/32; 525/54
[58] Field of Search ............................. 525/54; 521/32

[56] References Cited

U.S. PATENT DOCUMENTS

| | | | |
|---|---|---|---|
| 3,660,535 | 5/1972 | Finch | 525/54 |
| 3,755,281 | 8/1973 | Busby et al. | 525/54 |
| 3,922,255 | 11/1975 | Koestler et al. | 521/32 |
| 3,981,944 | 9/1976 | Okamoto et al. | 525/54 |

Primary Examiner—Joseph L. Schofer
Assistant Examiner—Peter F. Kulkosky

[57] ABSTRACT

Anion exchange resins produced by reacting a stabilized polychloromethylstyrene polymer bead with a polyamine containing at least two tertiary amine groups of which at least one is a terminal group, and processes for producing the resins in uniform sizes.

6 Claims, No Drawings

POLYAMINE-CROSSLINKED ANION EXCHANGE RESIN

This is a division of application Ser. No. 927,196 filed July 24, 1978 now U.S. Pat. No. 4,191,814.

BACKGROUND OF THE INVENTION

This invention is directed to a novel class of crosslinked anion exchange resins and their method of preparation.

Ion exchange resins have heretofore been conventionally manufactured by aqueous suspension polymerization of a monomer mixture comprising, for example, a large proportion of a monoethylenically unsaturated monomer and, as a crosslinker, a small proportion of a polyethylenically unsaturated monomer to form an intermediate crosslinked copolymer. The intermediate crosslinked copolymer resulting from the suspension polymerization is thereafter treated to introduce either a cationic or anionic ion exchange functional group by methods well known in this art. Unfortunately, this aqueous suspension polymerization which utilizes mechanical agitation to form the monomer droplets from which the resin heads are formed, yields crosslinked copolymer particles having a wide range of particle sizes which must be separated by screening or the like in order to furnish a product of relatively uniform size. The fines and oversize beads screened from the product often represent a substantial manufacturing loss as they have little economic value. Once crosslinked, the off-size beads cannot be reused as starting materials for suspension polymerization or recycled in any useful ion exchange process.

With anion exchange resins, crosslinking of the polymer bead prior to functionalization has generally been thought essential heretofore, in view of the requirements of the functionalization reactions. For example, uncrosslinked polymers tend to dissolve in the solvents necessary for swelling of the beads, a step generally required prior to amination of the resin. Accordingly, crosslinking of ion exchange resin copolymer precursors has been considered essential where the bead is to be subjected subsequently to vigorous chemical reaction to form functional ion exchange sites within the polymer backbone.

SUMMARY OF THE INVENTION

It has now been found that ion exchange resin beads may be prepared by simultaneously functionalizing and post-crosslinking a linear polymer prepared by suspension polymerization by a method which does not alter the physical integrity of the preformed linear polymer beads. Off-size particles of linear polymer formed in the suspension polymerization may be reused and recycled without loss of this valuable starting material. The post-crosslinking and functionalizing reaction involves contacting swollen linear polymer beads with a polyamine containing at least two tertiary amine groups, of which at least one is a terminal group.

A preferred embodiment of the invention is the crosslinked anion exchange resin derived from reacting a substantially linear poly(chloromethylstyrene) resin with a polyamine. In another preferred embodiment this invention relates to uniformly sized anion exchange resins crosslinked and functionalized with the polyamine compound.

The polyamines may be mixed with quaternary amines to increase the capacity of the resultant resins; such quaternary amines are described in a commonly assigned, simultaneously filed U.S. application Ser. No. 927,220 now abandoned in favor of divisional application Ser. No. 14,460 filed Feb. 23, 1979, incorporated herein by reference.

DETAILED DESCRIPTION

The entire process from monomer to functionalized anion exchange resin may be depicted as follows:

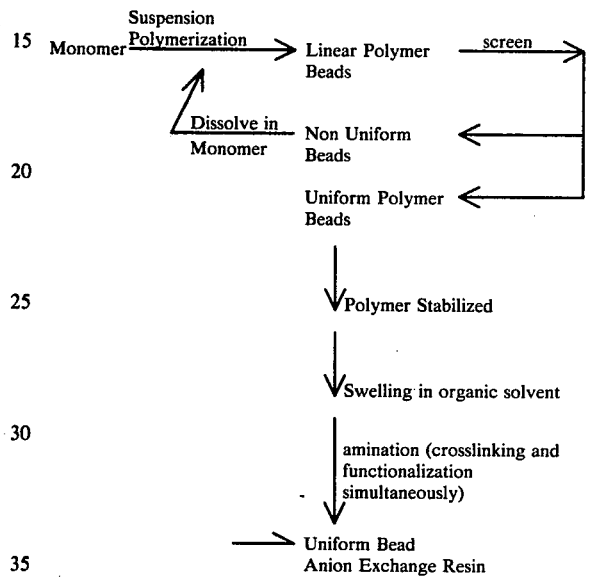

As illustrated above a monovinyl aromatic monomer containing a chloromethyl group or precursor thereof is first polymerized to form linear polymer beads. Thereafter, if the count of beads of a desired size is low, the beads of undesired size may be separated (as by screening or other technique) from the beads of desired size and recycled to the suspension polymerization stage, where the beads are dissolved in monomer and re-polymerized. The recycling may be continued until desired uniformity of size is achieved. Of course, if presized beads are available, such recycling is not required, or would not be required if size uniformity is optional.

The linear polymer beads useful in the invention contain chloromethyl groups on the aromatic nuclei of the linear polymer by virtue of being present in the original monomer or by starting with an original monomer which can be easily converted to furnish the chloromethyl groups without resorting to the prior art methods of chloromethylation in organic solvents, that is, without requiring reaction of the linear polymer with chloromethyl ether. Accordingly, typical monomers and any mixtures thereof which may be used include vinylbenzyl chloride (VBC), bis(chloromethyl)styrene, vinyltoluene and the like. For example, vinyltoluene may be first polymerized to form linear polymer beads which in turn, may be subsequently monochlorinated in the benzylic position. After polymerization and conversion to the chloromethyl form, the linear polymers have units of the general formula:

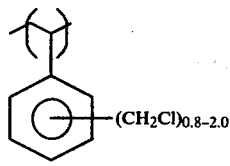

Various mixtures of the above stated monomers will yield between 0.8 and 2.0 chloromethyl groups per aromatic nucleus. It is preferred, however, to use vinylbenzyl chloride as the starting monomer to prepare the linear polymer bead and accordingly the product of preference contains approximately 1.0 chloromethyl groups for each aromatic nucleus.

As indicated in the flow diagram above, after the desired count of uniform beads has been reached, the linear polymer beads are stabilized so that when subjected to the requisite swelling step prior to the simultaneous functionalizing and post-crosslinking, they will swell but not dissolve in the organic swelling solvent. Among the means for achieving this stabilized state are the following:

(1) Thermal cross-linking:

A similar linear bead, which contains a small amount of benzyl alcohol functionality (by incorporating benzyl alcohol as a monomer, or by in situ hydrolysis during the suspension polymerization of a VBC monomer-containing mixture), is heated for a period of from about 2 to 8 hours at a temperature ranging from about 60° to 100° C. Typically, the poly(vinylbenzyl chloride) is lightly crosslinked by a thermal treatment (25 hours at 90° C.) to provide about 0.5-20% crosslinking based upon weight of starting polymer, preferably about 1-5% crosslinking. A commonly assigned application, simultaneously filed, Ser. No. 927225 (D.N. 76-70) describes more fully this aspect of the invention and is hereby incorporated by reference.

(2) Dispersion:

The linear polymer is added to an appropriate dispersion medium, and then the organic solvent is added. The dispersion medium keeps the solvent swollen beads separate one from another. Such dispersions are well known in the art, e.g., as described in U.S. Pat. No. 3,728,318.

(3) Slurrying:

The beads are slurried in a liquid in which the beads are insoluble, such as methanol. In this approach the swelling and crosslinking/functionalization (described in more detail below) may immediately follow by simultaneously adding an organic swelling solvent and polyamine.

Typical organic solvents used to swell the stabilized linear polymer in the swelling step include chlorinated hydrocarbons such as chlorobenzene, ethylene dichloride, perchloroethylene, propylene dichloride, and dichlorobenzene; aliphatic hydrocarbons such as hexane, isooctane and petroleum ether; nitroparaffins such as nitropropane; nitro substituted aromatic compounds such as nitrobenzene; and miscellaneous solvents such as carbon disulfide. Ethylene dichloride is the preferred solvent.

The simultaneous crosslinking and functionalization of the thermally crosslinked linear polymer beads can be accomplished with a variety of polyamines. The term "polyamine" as used in the specification and claims of this application is intended to encompass polyamines containing at least two tertiary amino groups of which at least one is a terminal group. Typical of such polyamines are the following:

(a) $(CH_3)_2N(CH_2)_nN(CH_3)_2$ wherein n is 2-12, preferably n is 4-6, most preferably 6;

(b) $(CH_3)_2N(CH_2)_mNH(CH_2)_{n'}$, $N(CH_3)_2$ wherein m and n' independently are 2-6. Preferably m and n' independently are 2-4, most preferably m=n'=3;

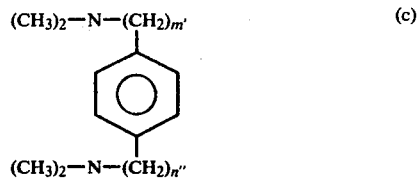

(c)

wherein m' and n" independently are 1-6, preferably 1-4, more preferably 1 or 2, most preferably 1;

(d) $(CH_3)_2N(CH_2)_mR^1N(CH_2)_{n'}N(CH_3)R^2$ wherein $R^1$ is hydrogen, $(C_1—C_6)$ alkyl or $(C_3—C_8)$ cycloalkyl; and $R_2$ is $(C_1—C_6)$ alkyl, $(C_3—C_6)$ cycloalkyl or $—(CH_2)_{n''}N(CH_3)_2$; and n", n' and m independently are 2-6;

(e) $(CH_3)_2N—(CH_2)_y—X—(CH_2)_z—N(CH_3)_2$ wherein X is oxygen, sulfur, or carbonyl; and y and z independently are 1-6;

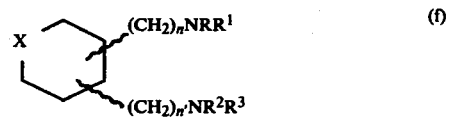

(f)

wherein

R, $R^1$, $R^2$ and $R^3$ independently are $(C_1—C_6)$ alkyl or $(C_3—C_8)$ cycloalkyl X is oxygen, sulfur; or $(CH_2)_y$ wherein y is 0-4; and n and n' independently are 0-6.

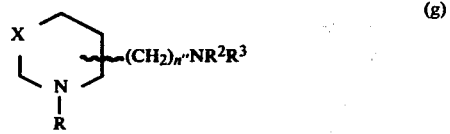

(g)

wherein n" is 0-6;

R is $(C_1—C_6)$ alkyl or $(C_3—C_8)$ cycloalkyl;

X is $CH_2)_y$ wherein y is 0-4, oxygen or sulfur;

$R^2$ and $R^3$ independently are $(C_1—C_6)$ alkyl, $(C_3—C_8)$ cycloalkyl, or a methylene chain.

(h)

wherein

R and $R^1$ independently are $(C_1—C_6)$ alkyl, $(C_6—C_{10})$ aryl, $(CH_2)n'NR^2R^3$ wherein $R^2$ and $R^3$ can be hydrogen, $(C_1—C_6)$ alkyl or $(C_3—C_8)$ cycloalkyl; or a chain of 1-6 methylene groups bridging the two nitrogens, e.g.,

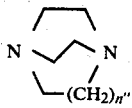

and n, n', and n" independently are 0-6.

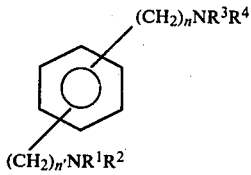

wherein
R$^1$, R$^2$, R$^3$ and R$^4$ independently are (C$_1$—C$_6$) alkyl or (C$_3$—C$_8$) cycloalkyl; and
n is n' independently are 1-4.

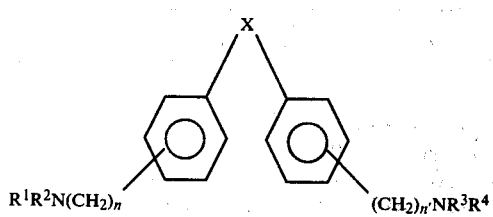

wherein
R$^1$, R$^2$, R$^3$ and R$^4$ independently are (C$_1$—C$_6$) alkyl or (C$_3$—C$_8$) cycloalkyl; and
n and n' independently are 1-4.

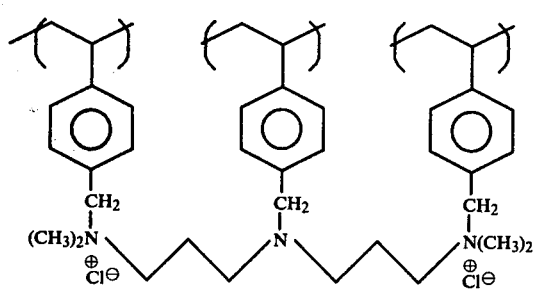

wherein
R$^1$, R$^2$, R$^3$ and R$^4$ independently are (C$_1$—C$_6$) alkyl or (C$_3$—C$_8$) cycloalkyl;
X is (CH$_2$)n", NR$^1$, oxygen, sulfur, or carbonyl; and
n, n' and n" independently are 1-4.

Typical polyamines of the foregoing structures include, for example, tetramethyliminobis-propylamine (TMIP), tetramethylhexamethylenediamine and fully N-alkylated triethylenetetramine, tetraethylenepentamine, pentaethylenehexamine and aminoethylpyrazine, wherein the N-alkyl group is lower alkyl, e.g., C$_1$-C$_6$.

The reaction with the polyamine can be carried out by adding the polyamine to be stabilized linear polymer while the latter is agitated and suspended, in a liquid which is a solvent for the polyamine, e.g., benzene, toluene, chlorobenzene, or perchloroethylene. The mixture may be allowed to react at room temperature, or preferably elevated temperatures, e.g., at from 25° to 120° C., and at atmospheric or super atmospheric pressures.

As is well known, resins containing primary or secondary amino groups will form weakly basic (secondary and tertiary amino groups) anion exchange resins, whereas tertiary amines, e.g., trimethyl amine or dimethylethanol amine, form strongly basic quaternary ammonium anion exchange resins. The latter resins are capable of absorbing anions such as chloride, sulfate, or hydroxyl ions from aqueous solutions. Since the functionalized resins of the invention may be based on polyamines which may vary in tertiary amine group content, the resulting resins may also vary in their proportion of quaternary ammonium functionality.

The simultaneous crosslinking and functionalization reaction may be illustrated with a VBC derived linear polymer (PVBC) in accordance with the following equation:

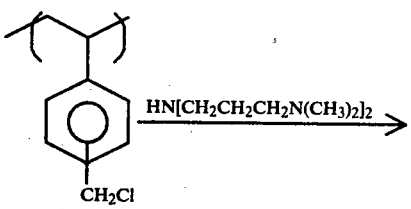

In the above equation, the single mole of polyamine reacts at the benzyl carbon atoms to crosslink the PVBC and furnish three functional ion exchange sites, two of which are strong base (quaternary) and one of which is weak base (tertiary amine).

Particularly preferred crosslinked resins of this invention may be represented by the formulas

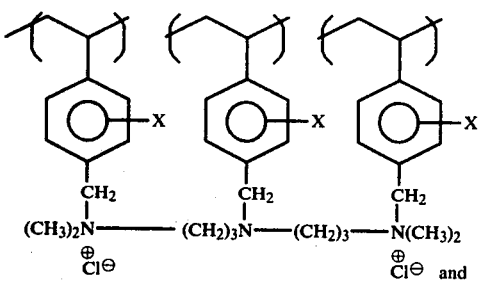

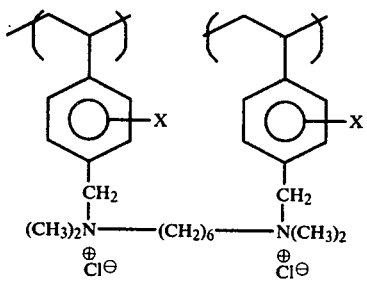

wherein X is hydrogen of (C$_1$-C$_6$) alkyl, such as methyl or ethyl; and wherein the initial linear polymer is in the form of uniform PVBC beads which are thermally lightly crosslinked (stabilized) so that they will not dissolve when they are swelled with an organic solvent (such as ethylene dichloride or propylene dichloride).

This treatment allows swelling of the beads in organic solvents, thus facilitating further reaction, without dissolving them.

The following abbreviations and terms will be used interchangeably throughout the remainder of this specification.

| | |
|---|---|
| MeOH | methanol |
| TX | thermally crosslinked |
| PVBC | polyvinylbenzyl chloride |
| TMIP | tetramethyliminobispropylamine |
| VBC | vinylbenzyl chloride |
| EDC | ethylene dichloride |
| DI | deionized |
| AER | anion exchange resin |
| TAEC | total anion exchange capacity |
| TSB | total strong base capacity |
| PDC | propylene dichloride |

The following specific examples further illustrate the present invention but should not be construed as limiting the broader aspects thereof. Except where noted otherwise all percentages and ratios are by weight.

EXAMPLE 1

(A) Preparation of TX-PVBC Polymer Beads

To a 2-liter, 3-neck roundbottom flask is added an aqueous solution consisting of 1.0 g. of Pharmagel (trademark) gelatin, 9.8 g. of Acrysol (trademark) A-5 dispersant, 300 ml of a 0.17% aqueous Methocel (trademark) solution, 16.6 g. of boric acid, 468 g. of DI water, and enough 50% aqueous sodium hydroxide to raise the pH to 10.3. To this mixture is added a solution of 7.14 g. of t-butyl peroctoate in 800.1 g. of VBC. A dispersion is formed by stirring the resulting mixture using three on-off cycles at a stirring rate of about 220 rpm. The temperature of the stirred nitrogen-purged reaction is increased to 65° C. over 1 hr., held at 65° C. for 6 hrs.; and then warmed to 95° and held 2 hrs. The reaction mixture is cooled and filtered. The resulting polyvinylbenzyl chloride (PVBC) beads are washed five times with 1 liter of water, air dried, and screened to provide 776 g. of −20/+100 mesh beads. From the 776 g., 430 g. of −40/+50 mesh beads are recovered and are thermally treated by heating 16 hrs. at 86° C., and then 16 hrs. at 90° C. in a vacuum oven.

(B) Amination of the TX-PVBC Polymer Resins with TMIP

To a 1-liter, 3-neck roundbottom flask is added 60.85 g. (0.4 mol) of the TX-PVBC resin beads of Example 1 (A) and a solution of 240 ml ethylene dichloride and 240 ml of methyl alcohol. After 30 minutes the temperature is increased to 60° C. and 74.6 (0.4 mol) of TMIP is added dropwise over 1.5 hour. After 2.5 hours at 60° C. the reaction is quickly cooled to 20° C., and the resin is collected by filtration and methanol rinsed in a funnel. The resin is transferred to a flask and washed two times with 1-liter of methanol and then washed three times with 1-liter of deionized water. The reactions in Examples 2–7 in Table 1 are the same as Example 1 in all essential respects.

TABLE I

Anion Exchange Resin From Reaction of Thermally-Crosslinked Poly VBC with TMIP

| Example Run | Addition Time and Temperature | Reaction Time and Temperature | % Solids | Total Anion Exchange Capacity Meg/g (dry) | Total Strong Base Capacity (% of TAEC) |
|---|---|---|---|---|---|
| 2 | 1.5 hr/60° C. | 2.5 hr/60° C. | 46 | 4.76 | 3.15 (66%) |
| 3 | 1.5 hr/60° C. | 2.5 hr/60° C. | 49 | 4.15 | 2.98 (72%) |
| 4 | 1 min/60° C. | 3.0 hr/60° C. | 44 | 4.62 | 2.94 (64%) |
| 5 | 1 min/25° C. | 1.25 hr/25–32° C. 3.0 hr/60° C. | 38 | 5.24 | 3.46 (66%) |
| 6 | 1.5 hr/60° C. | 2.5 hr/60° C. | 35 | 5.10 | 3.41 (67%) |
| 7 | 1.5 hr/60° C. | 2.5 hr/60° C. | 46 | 4.77 | 3.24 (67%) |

In example 3 only 0.5 mole of TMIP (relative to TX-PVBC) was used (1.5 nitrogen/—CH$_2$Cl); the other reactions of Table I employed equimolar amounts of TMIP and TX-PVBC, thus providing 3 nitrogen atoms/CH$_2$Cl group.
In example 6, a 3:1 (v/v) ethylene dichloride/MeOH solvent was used; the other reactions of Table I were carried out in 1:1 (v/v) EDC/MeOH.

Example 7 exemplifies recycle, as it makes good use of the thermoplastic PVBC beads of undesired particle size. The reaction is carried out identically to Example 2, except that the TX-PVBC used was prepared from a solution of 11% concentration of linear PVBC in VBC monomer.

EXAMPLE 8

To a 500-ml, 3-neck roundbottom flask is added 22.86 g (0.15 mol) of TX-PVBC (−40/+50 mesh) and a solution of 180 ml of 40% EDC/methanol (v/v). After one hour at 20° C. the temperature is lowered to 5° C. and 25.86 g (0.15 mol) of tetramethylhexamethylenediamine is added in one portion. The reaction is held at 5° C. for 5 hours, and then reacted at room temperature for 60 hours. The resin is collected by filtration, transferred to a flask, and washed twice with 800 ml portions of methanol, followed by washing twice with 100 ml portions of DI water.

The reaction in Examples 9–15 in Table II and 16 and 17 in Table III are the same as Example 8 in all essential respects.

TABLE II

Anion Exchange Resin From Reaction of Thermally-Crosslinked Poly VBC with Me$_2$N—(CH$_2$)$_n$—NMe$_2$

| Example Run | n | EDC: MeOH (v/v) | Addition Time and Temperature | Reaction Time and Temperature | % Solids | Total Anion Exchange Capacity meg/g (dry) | Total Strong Base Capacity (% of TAEC) |
|---|---|---|---|---|---|---|---|
| 9 | 4 | 50:50 | 1 hr/60° C. | 2.5 hr/60° C. | 33 | 4.42 | 4.08 (92%) |
| 10 | 4 | 38:62 | 1 hr/60° C. | 3.5 hr/60° C. | 49 | 4.18 | 4.00 (96%) |

TABLE II-continued

Anion Exchange Resin From Reaction of Thermally-Crosslinked Poly VBC with $Me_2N-(CH_2)_n-NMe_2$

| Example Run | n | EDC: MeOH (v/v) | Addition Time and Temperature | Reaction Time and Temperature | % Solids | Total Anion Exchange Capacity meg/g (dry) | Total Strong Base Capacity (% of TAEC) |
|---|---|---|---|---|---|---|---|
| 11 | 4 | 25:75 | 1 hr/60° C. | 2.5 hr/60° C. | 55 | 3.45 | 3.40 (99%) |
| 12 | 6 | 50:50 | 1 hr/60° C. | 2.5 hr/60° C. | 42 | 4.06 | 3.94 (97%) |
| 13 | 6 | 45:55 | 1 hr/60° C. | 3.5 hr/60° C. | 47 | 3.96 | 3.88 (98%) |
| 14 | 6 | 40:60 | 1 hr/60° C. | 2.5 hr/60° C. | 49 | 3.70 | 3.65 (99%) |
| 15 | 6 | 40:60 | 1 min/5° C. | 5° C./5 hr 20° C./60 hr | 41 | 4.09 | 3.90 (95%) |

All reactions of Table II used equimolar amounts of diamine and TX-PVBC (two nitrogens/—$CH_2Cl$).

TABLE III

Anion Exchange Resin From Reaction of Thermally-Crosslinked Poly VBC with Tetramethylxylylenediamines

| Example Run | Diamine | EDc: MeOH (v/v) | Reaction Time & Temperature | % Solids | Total Anion Exchange Capacity (meq/g(dry) | Total Strong Base Capacity (Meq/g(dry) |
|---|---|---|---|---|---|---|
| 16 | Para | 1:2 | 18 hr./25° C. | 40.4 | 4.23 | 3.49 |
| 17 | Meta | 1:2 | 18 hr./25° C. | 36.5 | 4.17 | 3.55 |

I claim:

1. A process for preparing anion exchange resin beads which comprises forming poly(chloromethylstyrene) beads under suspension polymerization conditions, stabilizing the beads, swelling the beads with an organic solvent, and reacting the swollen beads with a polyamine which will simultaneously crosslink and functionalize the beads, said polyamine containing at least two tertiary amine groups of which at least one is a terminal group.

2. A process according to claim 1 wherein the poly(chloromethylstyrene) bead to be reacted with the polyamine is poly(vinylbenzyl/chloride).

3. The process of claim 2 wherein the polyamine is tetramethyliminobispropylamine.

4. The process of claim 2 wherein the polyamine is N,N,N'N'-tetramethylhexamethylenediamine.

5. The process of claim 1 wherein the polyamine has the formula
   (a) $(CH_3)_2(CH_2)_nN(CH_3)_2$
       wherein n is 2-12; or
   (b) $(CH_3)_2N(CH_2)_mNH(CH_2)_{n'}N(CH_3)_2$
       wherein m and n' independently are 2-6.

6. The process of claim 5 wherein n is 4-6 and m and n' independently are 2-4.

* * * * *